March 19, 1968  JEAN-MARIE MASSOUBRE  3,374,460
SYSTEM FOR SIGNALING CONDITIONS ON RELATIVELY MOVING
MEMBERS OF A VEHICLE
Filed April 5, 1965  2 Sheets-Sheet 1

INVENTOR.
JEAN-MARIE MASSOUBRE
BY
ATTORNEYS

INVENTOR.
JEAN-MARIE MASSOUBRE

United States Patent Office 3,374,460
Patented Mar. 19, 1968

3,374,460
SYSTEM FOR SIGNALING CONDITIONS ON RELATIVELY MOVING MEMBERS OF A VEHICLE
Jean-Marie Massoubre, Clermont-Ferrand, France, assignor to Compagnie Generale des Establissments Michelin, raison sociale Michelin & Cie., Clermont-Ferrand, Puy-de-Dome, France
Filed Apr. 5, 1965, Ser. No. 445,402
14 Claims. (Cl. 340—58)

ABSTRACT OF THE DISCLOSURE

A system for signaling a condition on a first member rotatable with respect to a second member, including a pair of spaced apart, magnetically coupled stationary coils on the second member and a coil movable with the first member for passage between the pair of coils during each revolution of the rotating member. One of the coils of the pair is excited with an oscillator which produces a periodic electrical signal when the pair of coils is magnetically coupled. The oscillations of the signal are interrupted when the moving coil is short-circuited by a detector device responsive to the condition and passes between the coil pair to alter the magnetic coupling.

---

This invention relates to electronic signaling apparatus, and more specifically to apparatus for signaling the occurrence of a condition on one member rotatable relative to another member.

In many cases it is desired to be able to monitor a physical condition existing at some point on a moving member. This, of course, presents a necessity for transmitting the remote information originating on the moving member to a point or member which is stationary in relation thereto.

Where electrical apparatus is used for monitoring the remote condition, the employment of a physical electrical contact between some point on the moving member and another point on the stationary member frequently is precluded. For example, where it is desired to detect overheating or deflation of the pneumatic tires of a vehicle, the use of physical or electrical contacts, such as slip rings or the like, is generally unsatisfactory. The invention, on the other hand, is particularly well-suited to such an application.

Tire deflation warning devices requiring no physical electrical contact are already known. These devices employ radio transmitting equipment for transmitting the signal from the wheel assembly to a stationary pick-up device. These devices, however, are disadvantageous because they require a power source incorporated within each wheel such as, for example, an electric battery in the simplest case. Additionally, they are sensitive to atmospheric and industrial interferences and may themselves disturb radio receivers in their vicinity. Further, apparatus using radio transmission may also interfere with similar warning apparatus installed in other vehicles.

The invention overcomes these and other disadvantages of known devices by providing a signaling system including a magnetically coupled pair of coils on a stationary member, a coil movable with a rotatable member, and a detector on the rotatable member adapted to short-circuit the movable coil upon the occurrence of a monitored condition. When the condition occurs, the coil is short-circuited, and as it comes into the vicinity of the pair of magnetically coupled coils, it causes an alteration of the magnetic field between the pair of coils.

The invention additionally provides means responsive to the magnetic coupling between the pair of coils for detecting and giving an indication of the occurrence of the monitored condition.

A signaling or warning device according to the invention utilizes the principle of interrupting the magnetic coupling between two fixed coils by the passage of a short-circuited moving coil close to, and preferably, between them. An embodiment of this principle provides a useful means for transmitting a signal between a rotating member and a stationary member.

Thus, the effectiveness of a signaling system in accordance with the invention is not impaired by any of the aforementioned disadvantages, and in the case where it is used for warning of abnormal conditions in pneumatic tires, it offers an additional advantage of simplicity of installation. Moreover, the use of simple, rugged elements is possible, providing reliable operation under a variety of conditions. This is especially important where the device is used on trucks or other vehicles of the "heavy duty" class where it may be exposed to high temperatures, vibration and shocks, humidity, mud, grease, and inflammable or noxious vapors.

The pair of coils may be suitably mounted in any manner close to the rotating wheel assembly, and the single coil may be easily affixed to the side of the wheel or brake drum. A detector for short-circuiting the rotating coil may consist of, for example, a pressure gage switch connected with the tire inflating valve which closes the switch whenever the tire pressure falls outside the acceptable operating pressure for the tire. The temperature of the tire may likewise be detected by a simple pressure- or thermosensitive switch. Any number of detectors, of course, may be used in conjunction with a single coil rotatable with the wheel assembly, thus permitting any one of a number of abnormal conditions in one or more tires on the same axle to be monitored by a single warning indication.

The magnetic decoupling of the fixed pair of coils may be detected in any suitable manner. In a preferred embodiment of the invention, however, an electronic oscillator is employed, in which the pair of coils is integral with the oscillator circuit. In the absence of an abnormal condition, when the moving coil is open-circuited, the magnetic coupling between the fixed pair of coils permits regenerative oscillation in the electronic oscillator. Then, a magnetic decoupling between the fixed pair of coils causes a cessation of the electrical oscillations. The oscillatory state of the oscillator may be sensed by further circuitry such as, for example, an electronic trigger and a memory circuit.

Although the invention has been described briefly above, a better understanding of it may be gained by reference to the following detailed description, taken in conjunction with the drawings, in which.

Figure 1:
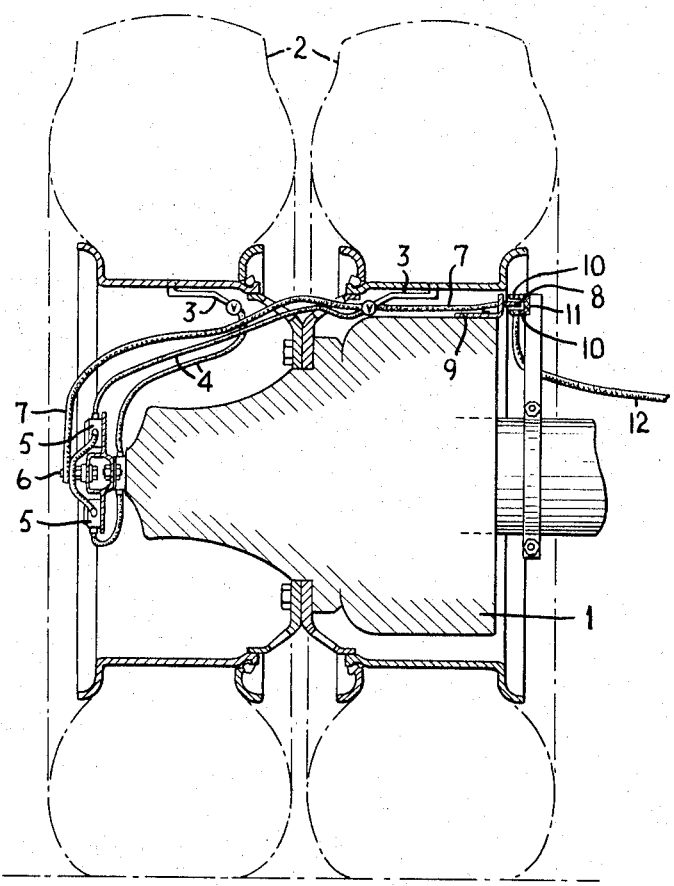
FIGURE 1 is a cross-section view of a vehicle wheel assembly, showing a typical installation of an apparatus in accordance with the invention.

Referring now to FIGURE 1, twin wheels 2 complete with tires are mounted on a hub 1. The inflating valves 3 of the tires are connected by the flexible tubing 4 to two pressure gage switches 5, respectively. One of the contacts in each of the switches 5 is connected internally to an electrical ground; the other contacts in the switches 5 are connected to a common terminal 6 which is insulated from the electrical ground. A shielded conductor 7, the shield of which is grounded electrically, joins one terminal of the rotatable coil 8 with the insulated terminal 6. The other terminal of the rotatable coil 8 is connected to ground. With the arrangement as described, closing either of the switches 5 will short-circuit the coil 8.

The coil 8 is fixed on a support 9, the latter being integral with the brake drum. During rotation of the wheel assembly, the coil 8 follows a circular trajectory, and during each turn it passes the vicinity of two coils 10 in a pick-up unit 11, the pick-up unit 11 being mounted to the axle of the vehicle.

The most effective magnetic decoupling between the pair of coils 10 in the pick-up unit 11 is effected by the passage of the rotatable coil 8 between the two coils 10. FIGURE 1 illustrates this arrangement. The coils 10 are sufficiently spaced to permit a clearance of approximately 4 mm. between the coil 8 and each of the coils 10. This clearance has been found sufficient to avoid physical contact between the coils 10 and the coil 8, notwithstanding vibrations of the rotating unit or the frame and bending of the axle. Additionally, this arrangement allows reliable operation in the presence of mud or other road grime which might collect on the coil 8 or the coils 10.

Figure 2:
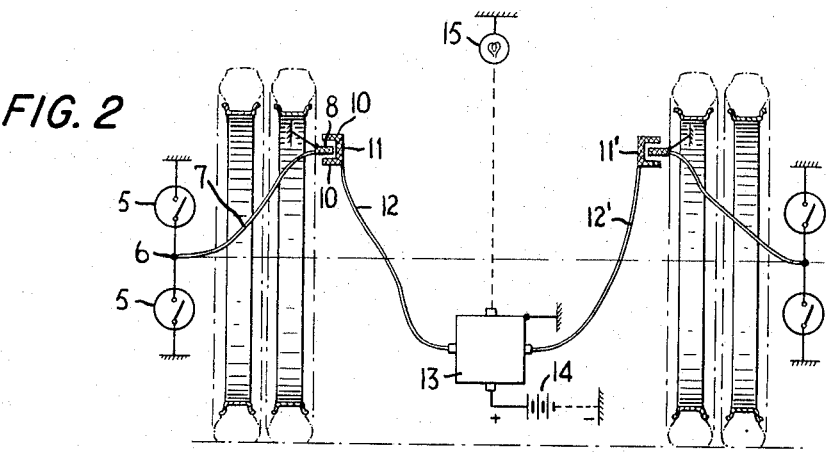
FIGURE 2 is a cross-section view of a rear wheel and tire assembly of the vehicle, showing schematically the installation of an apparatus in accordance with the invention.

The coil 8, as shown in cross-section in FIGURES 1 and 2, occupies a comparatively narrow sector of the total circular trajectory. The coil 8 may, however, be a circular continuous coil concentric with the wheel. A coil of this construction would permit a functioning of the warning system irrespective of the angular position of the wheel relative to the pick-up unit 11. It is preferable, however, to use the smaller coil construction illustrated in FIGURES 1 and 2 in order to keep the coil resistance within satisfactory limits.

Turning now to FIGURE 2, there is shown the installation arrangement of an apparatus in accordance with the invention, the electrical connections being shown schematically. A shielded connection 12 connects the two coil terminals of coils 10 on the left axle to an electronic circuit 13, described hereinafter. The electronic circuit 13 is affixed to the vehicle chassis and is similarly connected to the pick-up unit 11' mounted on the right axle by a dual conductor 12'. Electrical power is supplied to the circuit 13 by the vehicle battery, shown schematically at 14. A further connection between the circuit 13 and the cab of the vehicle connects an indicator, such as the light 15 in the cab, to a terminal of the circuit 13. The light 15 is adapted to be energized when an abnormality in tire pressure occurs.

Figure 3:
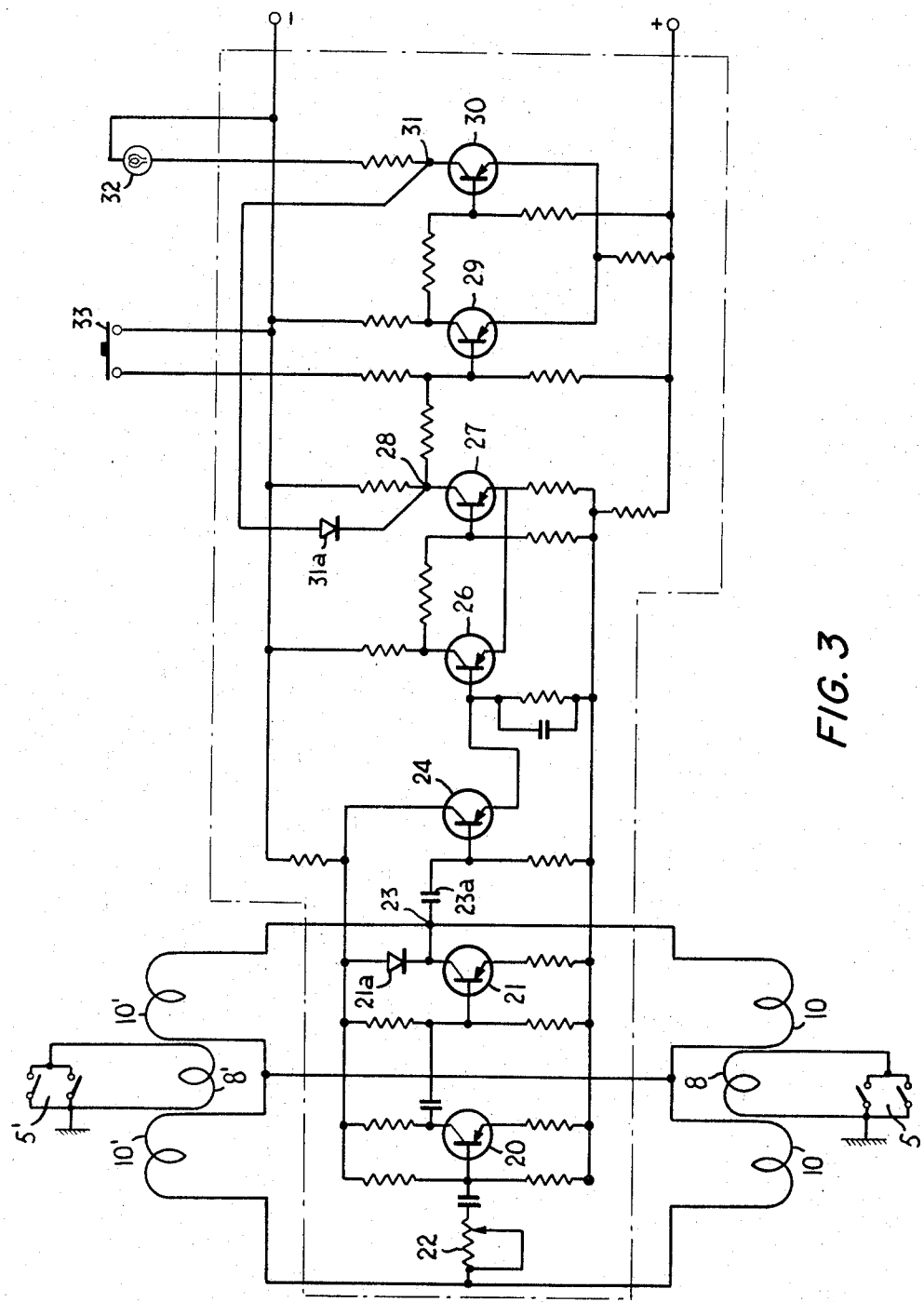
FIGURE 3 is an electrical schematic of a circuit for use with the invention.

FIGURE 3 shows a circuit 13 adapted to energize an indicator, such as the light 15 in FIGURE 2, when the magnetic coupling between the stationary coils 10 or 10' is altered. For the purpose of explaining the operation of this circuit, the coils 10 or 10' may be said to be magnetically decoupled when the magnetic field between the coils 10 or 10' is altered, or lessened, by the passage of the short-circuited coils 8 or 8', respectively. The magnetic decoupling, although it may be substantial, need not be complete. The circuit containing the rotating coils 8, 8' may be shorted by closing the pressure switches 5 and 5', respectively.

A blocking oscillator consists of the transistors 20, 21, the diode 21a, and their associated passive elements. Preferably, the oscillator transistors 20 and 21 are silicon transistors to provide greater temperature stability. In the circuit shown, when the coil 8 or 8' passes between the coils 10 or 10', respectively, the coils 10 or 10' become sufficiently decoupled to preclude regenerative oscillation in the transistorized oscillator circuit. Accordingly, the variable input resistance 22 is adjusted so that oscillations will be blocked when either of the coils 8, 8' in the decoupling position is short-circuited by the switches 5, 5', respectively. Since the coils 10 and the coils 10' are normally fully coupled, the absence of an alteration of the magnetic field by the short-circuited coils 8, 8' allows for sufficient regenerative feedback from the oscillator output 23 to the input resistance 22 to maintain oscillation. The frequency of oscillation is preferably between 5,000 and 50,000 cycles per second, although higher or lower frequencies may also be used satisfactorily.

An amplifying transistor 24, coupled to the output 23 of the oscillator through a coupling capacitor 23a, feeds a trigger including transistors 26 and 27. The trigger provides, at its output 28, a continuous voltage signal which is either "1," corresponding to maintained oscillations of the oscillator circuit, or "0" when the oscillations are blocked by the decoupling of the coils 10 or 10'.

The trigger output voltage signal drives a memory circuit comprised of transistors 29 and 30 and their associated resistances. At the output 31 of the memory circuit, the voltage is either "0" (transistor 30 in a state of relatively low conduction) or "1" (transistor 30 in a state of relatively high conduction). This circuit maintains transistor 30 in the "1" condition indefinitely once a "0" condition (oscillations blocked) appears at the output 28 of the trigger circuit. This is accomplished by the diode 31a which conducts if the output 28 of the trigger circuit, having once been triggered, thereafter decreases in potential.

A reset switch 33, which may be mounted in the cab of the vehicle, reconditions the memory circuit for sensing a "0" at the trigger output 28 by essentially grounding the input to the memory circuit at the base of the transistor 29 when the switch 33 is closed. Alternatively, the same result can be obtained by cutting the power supply from the vehicle battery.

Thus, the apparatus described requires no current supply in the rotating assembly. This greatly simplifies the construction and maintenance of this warning system and, furthermore, renders the system anti-inflammable, a characteristic which is very valuable where the system is used on vehicles carrying inflammable liquids. Further, the power induced in the moving coil is very low while it is short-circuited. As an additional advantage, the mounting or dismounting of a vehicle wheel assembly employing the invention requires merely the easiest of connecting and disconnecting operations.

A warning device for vehicle tires, according to the invention, is easily adaptable to the front wheels of a vehicle, as well as the rear wheels. In this case the pickup (11 in FIGURES 1 and 2) can be located on any part integral with the steering member or on a fixed part, such as the steering pivot.

It is understood that the embodiment of the invention described herein is illustrative only, and many modifications and variations may be made by one skilled in the art without departing from the spirit and scope of the invention. Accordingly, all such modifications and variations are intended to be included within the scope of the appended claims.

I claim:

1. In a signaling system adapted to signal a condition on a first member movable relative to a second member, a magnetically coupled pair of coils on the second member, a coil movable with the first member and positioned to alter the magnetic coupling between the pair of coils when the coil is short-circuited and in the vicinity of the pair of coils, a detector movable with the first member and adapted to close-circuit the coil upon the occurrence of the condition, and means connected to at least one of the coils of the pair and responsive to the magnetic coupling therebetween to generate a periodic signal when the magnetic coupling is unaltered and to interrupt the signal when the magnetic coupling is altered by the close-circuited condition of the movable coil.

2. Apparatus in accordance with claim 1 wherein the coils of said pair of coils on the second member are spaced apart for receiving therebetween said coil movable with the first member.

3. Signaling system in accordance with claim 1 for signaling a condition of a pneumatic tire or the like, in which the first member is an assembly carrying the tire and said detector is responsive to a condition of the tire.

4. Signaling system in accordance with claim 3 wherein said detector is responsive to the pneumatic pressure of the tire.

5. Signaling system in accordance with claim 3 wherein said detector is responsive to the temperature of the tire.

6. A signaling system in accordance with claim 1, in which said means comprises a regenerative oscillator circuit connected to the coil pair to sustain the periodic signal when the magnetic coupling between the pair of coils is unaltered and to interrupt the signal when the magnetic coupling is altered, the apparatus further comprising means for detecting the oscillatory state of the oscillator circuit.

7. Apparatus in accordance with claim 6 comprising means for indicating the oscillatory state detected by said detecting means.

8. Apparatus for signaling a condition on a first member rotatable relative to a second member comprising, in combination, a coil circuit movable with the first member, a detector movable with the first member and adapted to close the coil circuit upon the occurrence of the condition, a pair of coils on the second member, means responsive to the magnetic coupling of the coil pair for generating electrical oscillations having separate frequency characteristics when the pair of coils is magnetically coupled and decoupled, said pair of coils being magnetically decoupled when said movable coil circuit is closed and in the vicinity of the pair of coils, and means for detecting and indicating one of the characteristics of the electrical oscillations.

9. Apparatus for signaling a condition on a first member rotatable relative to a second member comprising, in combination, a coil circuit movable with the first member, a detector movable with the first member and adapted to close the coil circuit upon the occurrence of the condition, a pair of coils on the second member, the coil pair being normally magnetically coupled and being decoupled when the movable coil circuit is closed and in the vicinity thereof, an oscillator connected to the pair of coils and adapted to generate electrical oscillations when the pair of coils is magnetically coupled, a trigger circuit responsive to the electrical oscillations and adapted to provide a first signal upon the termination of the electrical oscillations, a memory circuit for receiving said first signal and operable between first and second conductive states in the presence and absence of the first signal, respectively, and means responsive to one of the conductive states of the memory circuit for providing an indication of the condition.

10. A system as defined in claim 2, in which the moving clearance between the coil pair and moving coil is about 4 millimeters.

11. A system as defined in claim 1, in which the frequency of the periodic signal is between about 5,000 and 50,000 cycles per second when the magnetic coupling is unaltered.

12. A system according to claim 1, further comprising means coupled to the periodic signal means for developing a trigger signal having levels representative of the interruption and presence frequency of the periodic signal, respectively, and means responsive to the level of the trigger signal to provide an output indicating signal.

13. A system as defined in claim 12, further comprising means responsive to one of the trigger signal levels for maintaining that signal at such level thereafter and irrespective of the frequency of the periodic signal.

14. A system as defined in claim 13, further comprising means coupled to one of the trigger and output indicating signals means for selectively returning the trigger signal to the other of said levels upon removal of the condition.

References Cited

UNITED STATES PATENTS

| | | | |
|---|---|---|---|
| 2,439,561 | 4/1948 | Cressey | 340—58 |
| 2,442,104 | 5/1948 | Twombly | 340—58 |
| 3,093,812 | 6/1963 | Brown | 340—58 |

JOHN W. CALDWELL, *Primary Examiner.*

NEIL C. READ, A. H. WARING, *Examiners.*